(12) United States Patent
Wilkins et al.

(10) Patent No.: US 7,845,949 B2
(45) Date of Patent: Dec. 7, 2010

(54) ULTRASOUND TRAINING MANNEQUIN

(76) Inventors: Jason D. Wilkins, 5620 W. Ruben La., Springfield, MO (US) 55802; O. John Ma, 2620 SW. 64th Pl., Portland, OR (US) 97225

( * ) Notice: Subject to any disclaimer, the term of this patent is extended or adjusted under 35 U.S.C. 154(b) by 49 days.

(21) Appl. No.: 11/884,118

(22) PCT Filed: Jan. 13, 2006

(86) PCT No.: PCT/US2006/001162

§ 371 (c)(1),
(2), (4) Date: Apr. 21, 2008

(87) PCT Pub. No.: WO2006/086115

PCT Pub. Date: Aug. 17, 2006

(65) Prior Publication Data

US 2008/0293029 A1 Nov. 27, 2008

(51) Int. Cl.
*G09B 23/28* (2006.01)
(52) U.S. Cl. .................. 434/268; 434/267
(58) Field of Classification Search ............... 434/262, 434/267, 268, 272
See application file for complete search history.

(56) References Cited

U.S. PATENT DOCUMENTS

| 2,495,568 | A |   | 1/1950 | Coel |
| 3,855,714 | A |   | 12/1974 | Block |
| D256,373 | S |   | 8/1980 | Marks |
| 4,493,653 | A |   | 1/1985 | Robbins et al. |
| 4,894,013 | A | * | 1/1990 | Smith et al. ............. 434/268 |
| 5,055,051 | A | * | 10/1991 | Duncan ................. 434/262 |
| 5,061,187 | A | * | 10/1991 | Jerath .................... 434/262 |
| 5,397,237 | A |   | 3/1995 | Dhont et al. |
| 5,513,992 | A |   | 5/1996 | Refait |
| 5,620,326 | A |   | 4/1997 | Younker |
| 5,803,746 | A |   | 9/1998 | Barrie et al. |
| 6,039,573 | A | * | 3/2000 | Petrick et al. ............ 434/268 |
| 6,074,214 | A |   | 6/2000 | Browne-Wilkinson |
| 6,190,915 | B1 | * | 2/2001 | Madsen et al. ............ 436/8 |
| 6,205,871 | B1 | * | 3/2001 | Saloner et al. .......... 73/866.4 |
| 6,210,168 | B1 |   | 4/2001 | Aiger et al. |

(Continued)

FOREIGN PATENT DOCUMENTS

WO    WO93/17409    9/1993

(Continued)

*Primary Examiner*—Kurt Fernstrom
(74) *Attorney, Agent, or Firm*—Richard C. Litman (57) ABSTRACT

The ultrasound training mannequin (100) is a device that provides a realistic medical training device for use by medical personnel, especially those in the field of emergency medicine, to gain experience in applying and analyzing the results of common ultrasound examinations. The mannequin (100) comprises a life-size model of the male torso. The mannequin (100) has a simulated human skin (20) and tissue structure (22) made of a silicone. Internal organs, such as the lungs, heart, liver, kidneys, gall bladder, urinary bladder, and spleen are placed inside the model in their normal occurring relative positions. Heavier organs are modeled with a variable density silicone material to simulate the actual sonic density of these organs. The lungs are modeled with a variable density foam material to simulate the sonic density of actual lungs. The mannequin (100) also includes artificial venous and arterial channels emanating from and terminating at the heart.

13 Claims, 10 Drawing Sheets

U.S. PATENT DOCUMENTS

| | | |
|---|---|---|
| 6,503,087 B1 | 1/2003 | Eggert et al. |
| 6,568,941 B1 | 5/2003 | Goldstein |
| 6,780,016 B1 | 8/2004 | Toly |
| 7,059,168 B2 * | 6/2006 | Hibi et al. .................... 73/1.86 |
| 7,255,565 B2 * | 8/2007 | Keegan ....................... 434/272 |
| 2002/0076681 A1 | 6/2002 | Leight et al. |
| 2003/0091967 A1 * | 5/2003 | Chosack et al. ............. 434/262 |
| 2004/0126746 A1 | 7/2004 | Toly |
| 2005/0214727 A1 * | 9/2005 | Stoianovici et al. ......... 434/262 |

FOREIGN PATENT DOCUMENTS

| | | |
|---|---|---|
| WO | WO93/21619 | 10/1993 |

* cited by examiner

ULTRASOUND TRAINING MANNEQUIN

TECHNICAL FIELD

The present invention relates to medical training devices, and more specifically to a simulated human training device used for training ultrasound techniques, and interpretation and analysis of realistic ultrasound images.

BACKGROUND ART

Ultrasound imaging techniques have been employed for some time by physicians in examining the condition of the body's internal organs without physical intrusion into the body cavity. In applying such techniques, high frequency ultrasonic sound is transmitted into the body usually through an ultrasonic transducer moved about the surface of the body. Some of this sound is reflected by internal organs with the intensity and spatial characteristics of the reflected sound corresponding to the arrangement and physical condition of the reflecting organs. The transducer receives the reflected sound and converts it to corresponding electrical pulses that are transmitted to an electronic analyzer. The information embodied in the pulses is electronically interpreted by the analyzer and displayed on a video monitor as outlined images of the internal organs for review by attending physicians.

Medical personnel, especially those working in the field of emergency medicine, are often required to perform ultrasounds on patients in order to diagnose common abnormalities and diseases that are found in body organs, major arteries, and major veins that are generally focused on in the emergency room setting. These organs generally include the lungs, heart, liver, kidneys, gall bladder, urinary bladder, and spleen.

Unfortunately, clinical training of medical personnel in ultrasound techniques and analysis has been severely limited because such training has usually been restricted to experience gained through ultrasonic examination of actual living patients. Naturally, one cannot choose the number and frequency of such patients or the types and degrees of their respective maladies. Consequently, training through actual experience has proven to be sporadic at best and generally limited to the most commonly encountered maladies.

In some instances, ultrasound "phantoms" are used in the testing of common ultrasound equipment. These "phantoms" are generally large blocks of a silicone or latex material and are used to test dummy or simulated ultrasound equipment for accuracy due to their similarity to the structure of actual human skin tissue. However, these "phantoms" fall far short of providing a realistic and reliable training aid for medical personal seeking to gain experience on ultrasound equipment used in the field.

What is needed is a realistic device for training medical personnel, especially those in the field of emergency medicine, in the use of ultrasound equipment and in the interpretation and analysis of resulting ultrasonic images.

Thus, an ultrasound training mannequin solving the aforementioned problems is desired.

DISCLOSURE OF THE INVENTION

This disclosure is directed to an ultrasound training mannequin that is comprised of a mostly solid body member configured to simulate the human male torso. The mannequin includes a lower neck portion, two upper arm portions, and two upper leg portions. The mannequin has one or more cavities within the body member and has one or more organ members that are contained within the cavities of the body member. The organ members are constructed to simulate the ultrasonic response of internal human organs during ultrasonic examination. The body member also has one or more hollow channels that are constructed to simulate the ultrasonic response of internal human veins and arteries during ultrasonic examination.

This disclosure is also directed to an ultrasound training mannequin that is comprised of a mostly solid body member configured to simulate the human male torso with an outer skin structure. The mannequin includes a lower neck portion, two upper arm portions, and two upper leg portions. The mannequin has one or more cavities within the body member and has one or more organ members that are contained within the cavities of the body member. The organ members are constructed to simulate the ultrasonic response of internal human organs during ultrasonic examination. The body member also has one or more hollow channels that are constructed to simulate the ultrasonic response of internal human veins and arteries during ultrasonic examination. An outer skin structure covers the body member. The skin is constructed of silicone material to simulate the ultrasonic response of human skin during ultrasonic examination. An interior tissue structure within the body member is constructed from a silicone material to simulate the ultrasonic response of human tissue during ultrasonic examination.

BRIEF DESCRIPTION OF THE DRAWINGS

Similar reference characters denote corresponding features consistently throughout the attached drawings.

BEST MODES FOR CARRYING OUT THE INVENTION

The ultrasound training mannequin of the present invention provides a medical training device for use by medical personnel, especially those in the field of emergency medicine, to gain experience in applying and analyzing the results of common ultrasound examinations. While the particular embodiment addressed herein relates to training only on specific parts of the human anatomy, it will be obvious that the embodied principles apply equally to ultrasound training in general.

The mannequin comprises a life-size model of the male torso including a small portion of the lower neck, a small portion of each upper arm, and a small portion of each upper leg. The mannequin has a simulated human tissue structure made of a silicone material and covering the entire exterior of the model. Pigments can be incorporated into this layer of silicone material in order to most closely represent human skin tones. In addition to the simulated tissue structure around the exterior of the model, the mannequin further includes simulated tissue structure made of a silicone material throughout the interior.

Internal organs, such as the lungs, heart, liver, kidneys, gall bladder, urinary bladder, and spleen are placed inside the model within individual cavities in their normal occurring relative positions. Heavier organs, including the heart, liver, kidneys, gall bladder, urinary bladder, and spleen are modeled with a variable density silicone material to simulate the sonic density of these organs as they would be inside a living human being. The organs and cavities can be filled with water or ultrasound gel to simulate naturally occurring body fluid. Various simulated abnormalities such as tumors, cysts, stones, fluid build-up and foreign bodies can be implanted in these organ models or in the cavities surrounding them. The lungs are modeled with a variable density foam material to simulate the sonic density of the lungs as they would be inside a living human being.

The mannequin also includes artificial venous and arterial channels emanating from and terminating at the heart. These channels are modeled with a latex material and represent major arteries and veins within the human body including the aorta, femoral artery and vein, carotid artery, and internal jugular vein. The latex modeled channels can be filled with water or a typical ultrasound gel in order to most closely simulate the flow of blood through the cardiovascular system. These channels, especially the aorta, can be further equipped with internal balloons that can be inflated in order to simulate aneurysms and other cardiovascular abnormalities.

With the model thus assembled, a trainee can perform an ultrasound examination thereon just as he would with a live patient by moving the ultrasound transducer about the outer surface of the silicone skin layer. The internal structure and silicone covering of the model closely simulate the touch and feel of the body of an actual patient as the examination proceeds and the simulated internal organs, veins, and arteries and implanted abnormalities produce ultrasound images that closely parallel in character and appearance those produced by living organs and corresponding actual abnormalities. Thus, the trainee can experience the touch and feel of an actual ultrasound examination and can experiment with the subtle manipulations of the transducer that can result in improved ultrasound images. More importantly, the trainee can gain invaluable experience in interpreting the real time ultrasound images produced by his examination to detect and diagnose the various abnormalities that may have been implanted in the model.

The first embodiment of the present invention is designated generally as 100 as and is shown in FIGS. 1-9.

Figure 1:
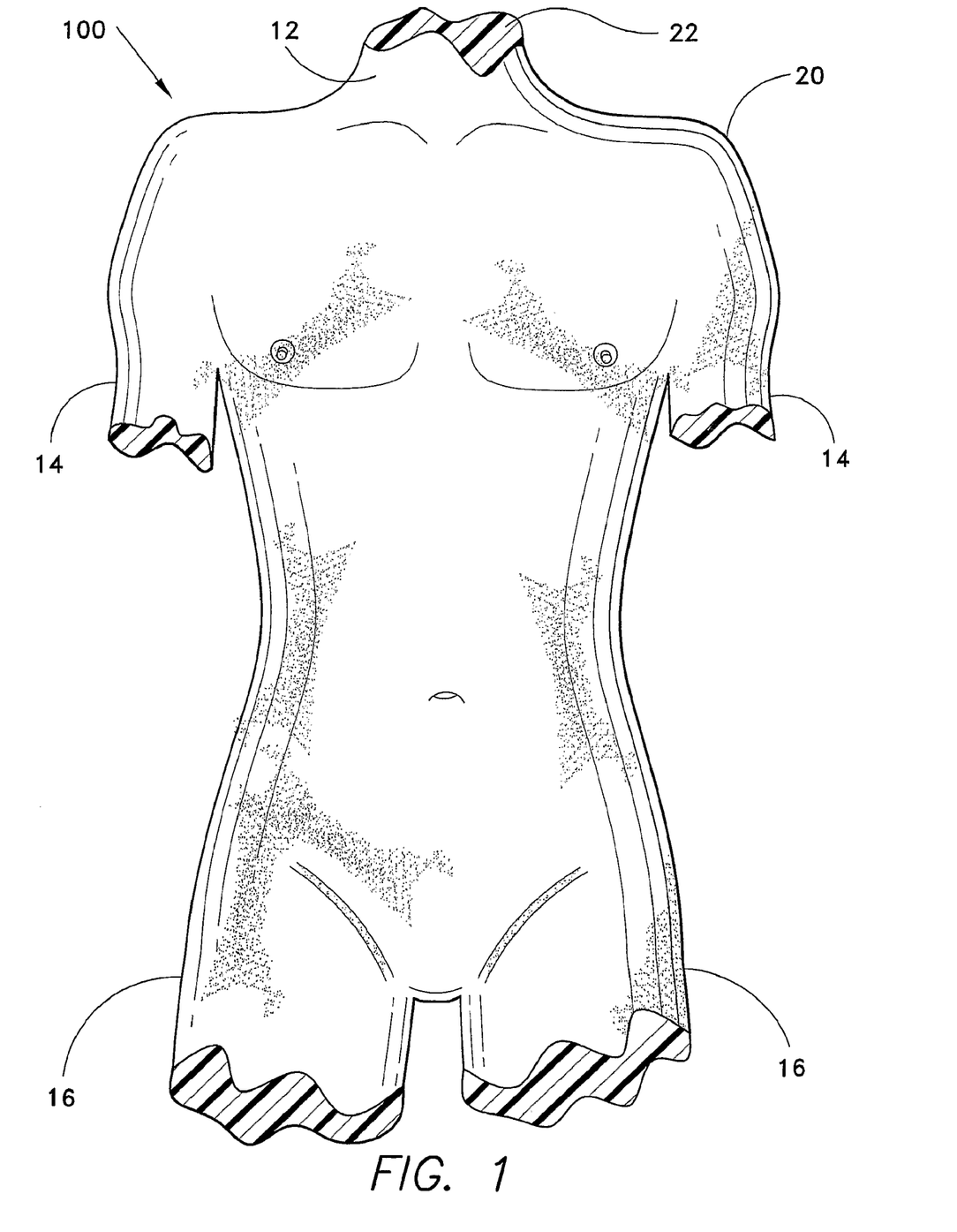
FIG. 1 is a top plan view of an ultrasound training mannequin according to the present invention.

As shown in FIG. 1, the mannequin 100 is substantially proportional to the dimensions of a fully grown male torso and including a portion of the lower neck, a portion of each upper arm, and a portion of each upper leg. However, in another aspect of the invention, the mannequin is also provided in proportions of the fully grown average female. And in yet another aspect of the present invention, the trainer is provided in proportions of a small child and infant.

The mannequin 100 has a simulated human skin structure 20 made of a silicone material and covering the entire exterior of the model. Preferably, the simulated skin structure 20 is pigmented to present a visually similar appearance to that of a human being. In addition to the simulated skin structure 20 around the exterior of the model, the mannequin 100 further includes simulated tissue structure 22 made of a silicone material throughout the interior.

Figure 2:
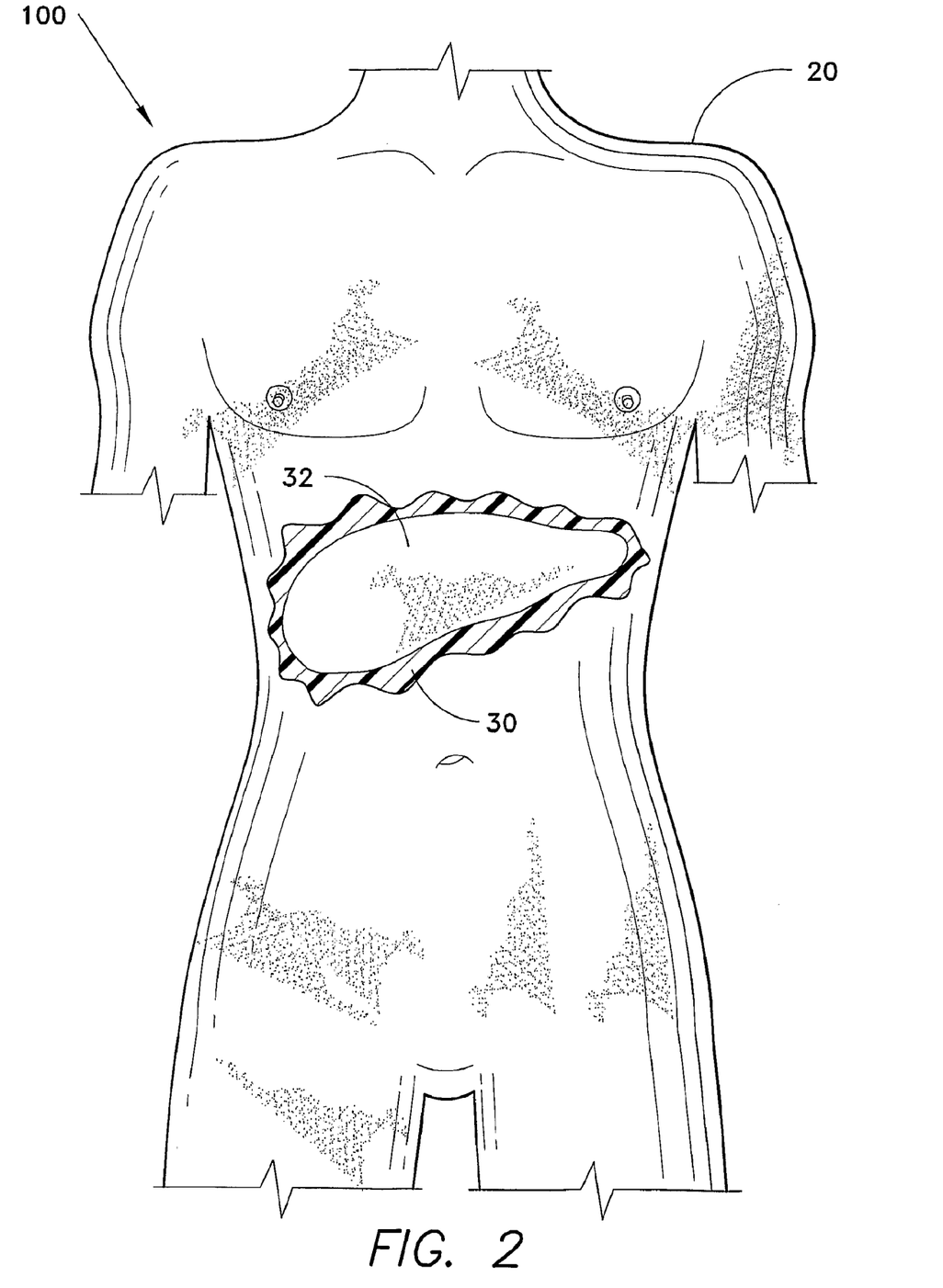
FIG. 2 is a top plan view of the ultrasound training mannequin of FIG. 1 with the simulated tissue removed, exposing the liver cavity and simulated liver.

Referring now to FIG. 2, a portion of the simulated skin structure 20 and simulated tissue structure 22 have been removed from mannequin 100 exposing the liver cavity 30 and the simulated liver 32. Preferably, the simulated liver 32 is made with a variable density silicone material to simulate the sonic density of the liver as it would be inside a living human being.

Figure 3:
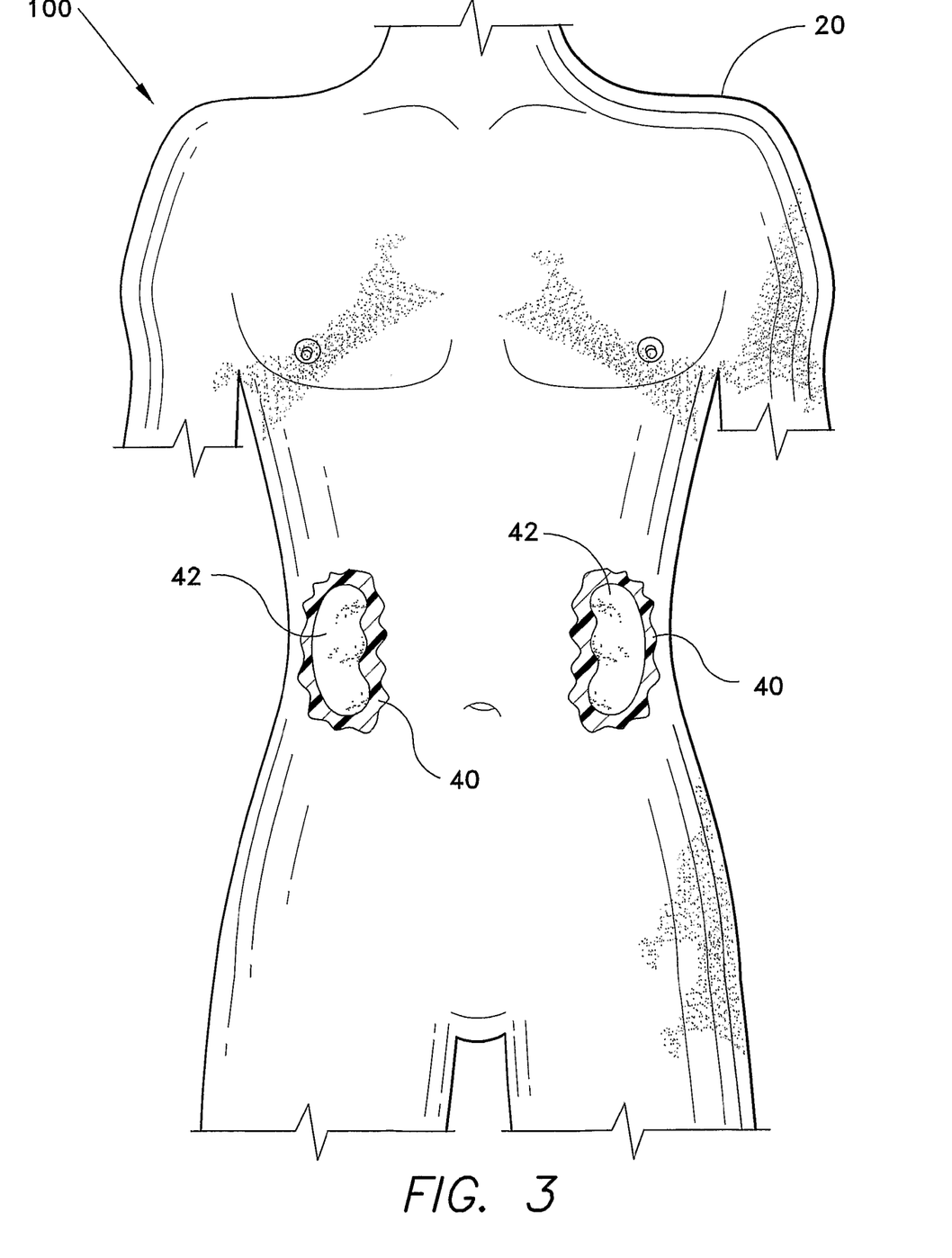
FIG. 3 is a top plan view of the ultrasound training mannequin of FIG. 1 with the simulated tissue removed, exposing the kidney cavities and simulated kidneys.

Referring next to FIG. 3, portions of the simulated skin structure 20 and simulated tissue structure 22 have been removed from mannequin 100 exposing the kidney cavities 40 and simulated kidneys 42. Preferably, the simulated kidneys 42 are made with a variable density silicone material to simulate the sonic density of the kidneys as they would be inside a living human being.

Figure 4:
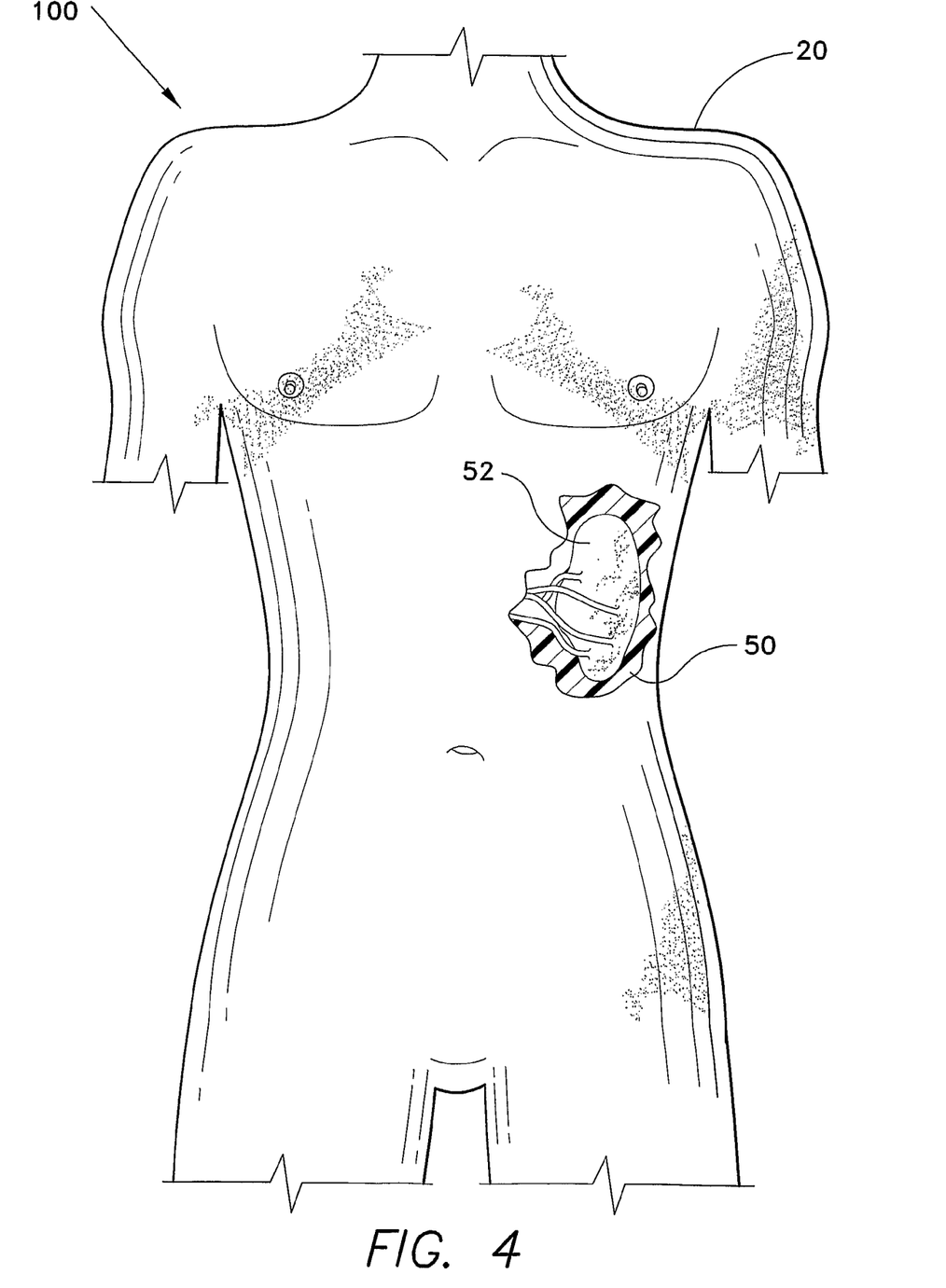
FIG. 4 is a top plan view of the ultrasound training mannequin of FIG. 1 with the simulated tissue removed, exposing the spleen cavity and simulated spleen.

Referring next to FIG. 4, a portion of the simulated skin structure 20 and simulated tissue structure 22 have been removed from mannequin 100 exposing the spleen cavity 50 and simulated spleen 52. Preferably, the simulated spleen 52 is made with a variable density silicone material to simulate the sonic density of the spleen as it would be inside a living human being.

Figure 5:
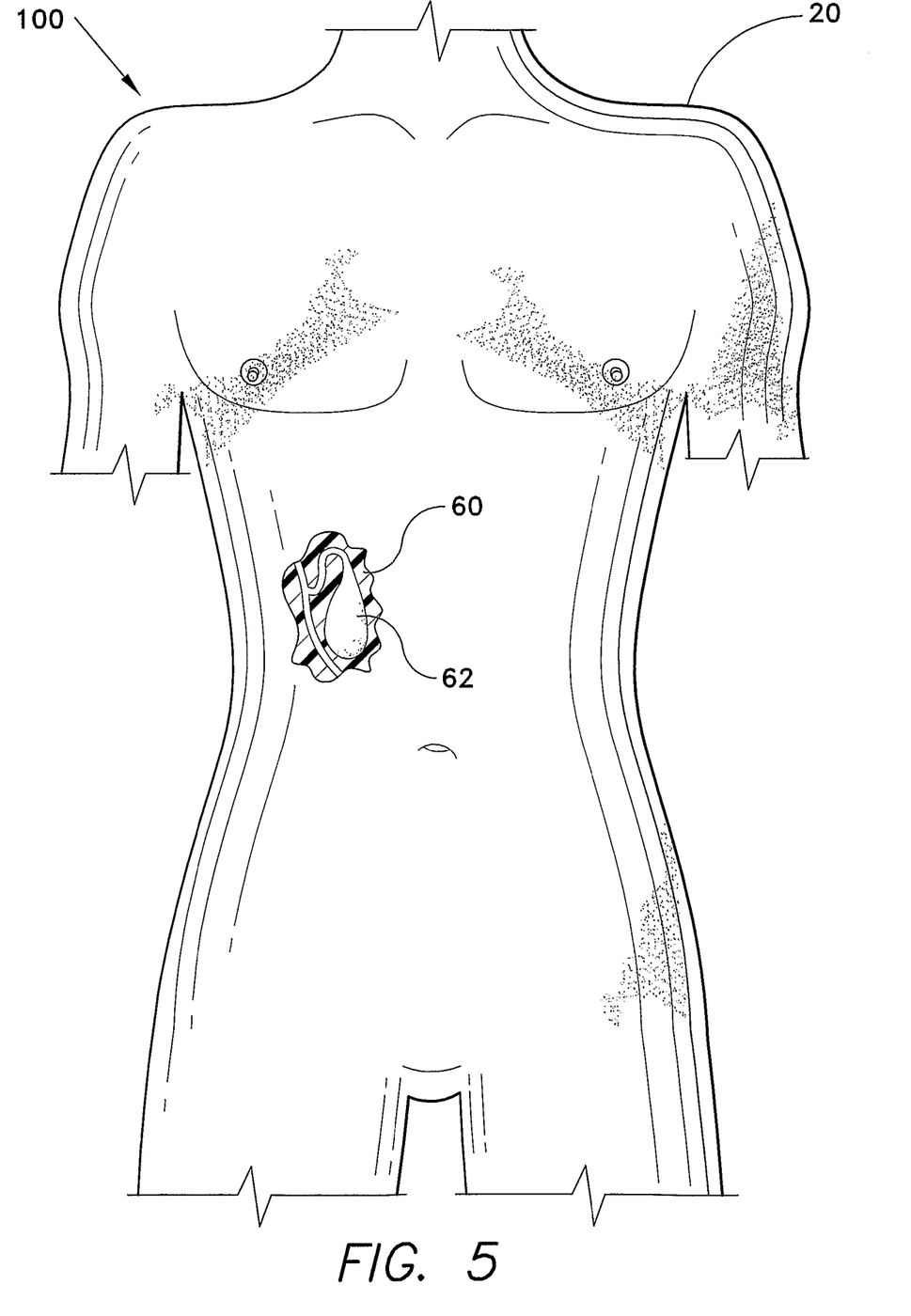
FIG. 5 is a top plan view of the ultrasound training mannequin of FIG. 1 with the simulated tissue removed, exposing the gall bladder cavity and simulated gall bladder.

Referring next to FIG. 5, a portion of the simulated skin structure 20 and simulated tissue structure 22 have been removed from mannequin 100 exposing the gall bladder cavity 60 and simulated gall bladder 62. Preferably, the simulated gall bladder 62 is made with a variable density silicone material to simulate the sonic density of the gall bladder as it would be inside a living human being.

Figure 6:
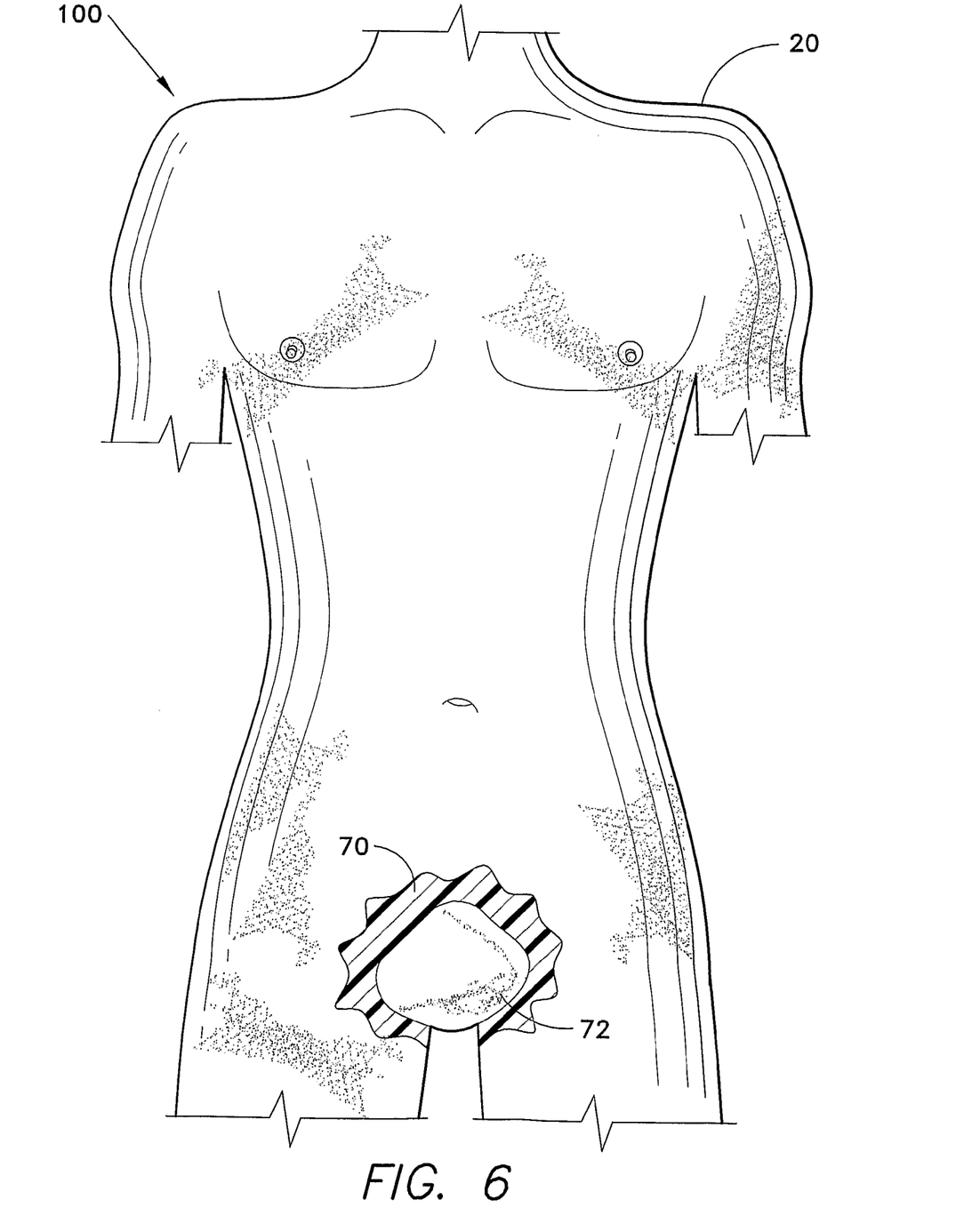
FIG. 6 is a top plan view of the ultrasound training mannequin of FIG. 1 with the simulated tissue removed, exposing the urinary bladder cavity and simulated urinary bladder.

Referring next to FIG. 6, a portion of the simulated skin structure 20 and simulated tissue structure 22 have been removed from mannequin 100 exposing the urinary bladder cavity 70 and simulated urinary bladder 72. Preferably, the simulated urinary bladder 72 is made with a variable density silicone material to simulate the sonic density of the urinary bladder as it would be inside a living human being.

Figure 7:
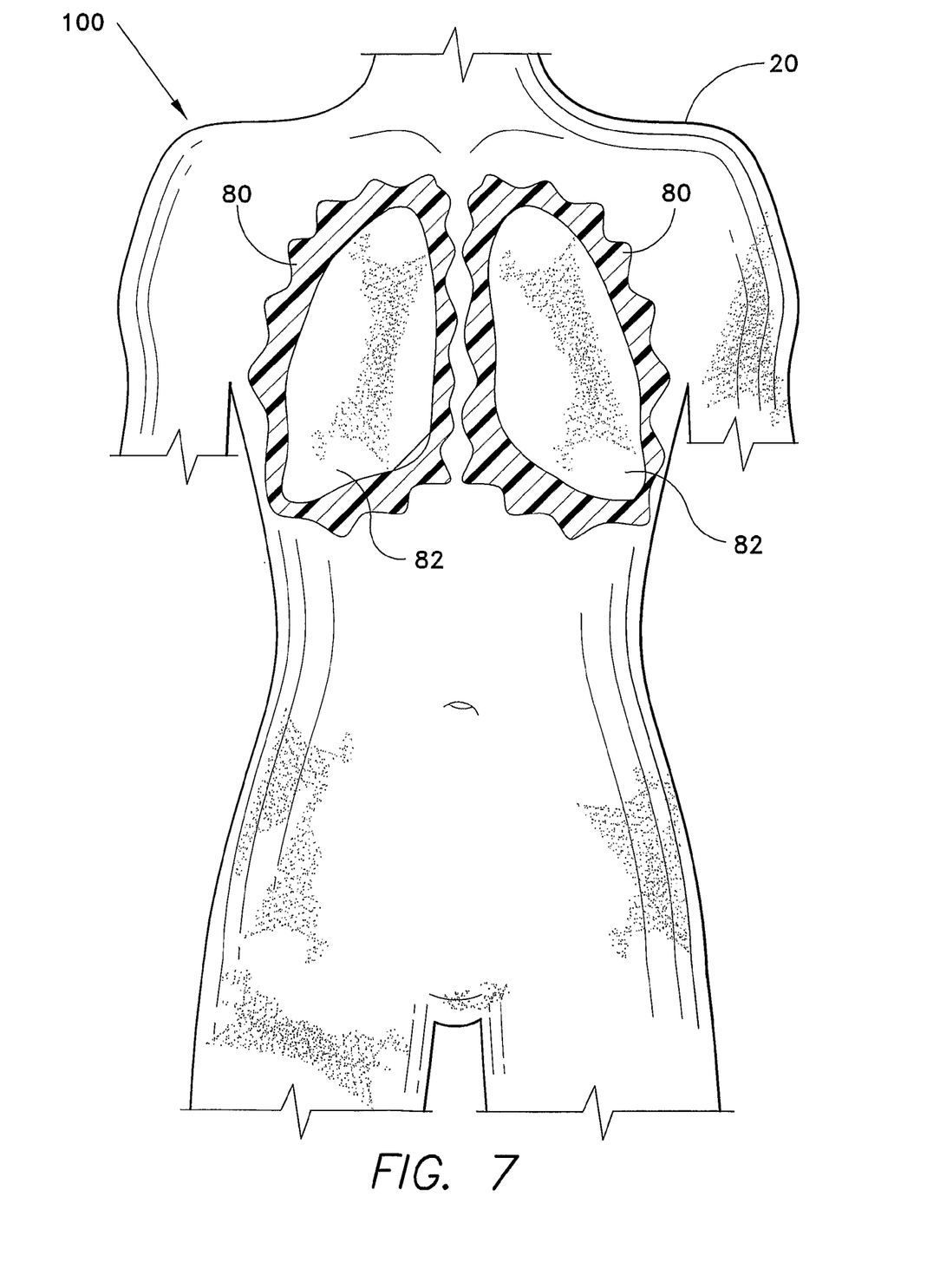
FIG. 7 is a top plan view of the ultrasound training mannequin of FIG. 1 with the simulated tissue removed, exposing the lung cavities and simulated lungs.

Referring next to FIG. 7, a portion of the simulated skin structure 20 and simulated tissue structure 22 have been removed from mannequin 100 exposing the lung cavities 80 and simulated lungs 82. Preferably, the simulated lungs 82 are made with a variable density foam material to simulate the sonic density of the lungs as they would be inside a living human being.

Figure 8:
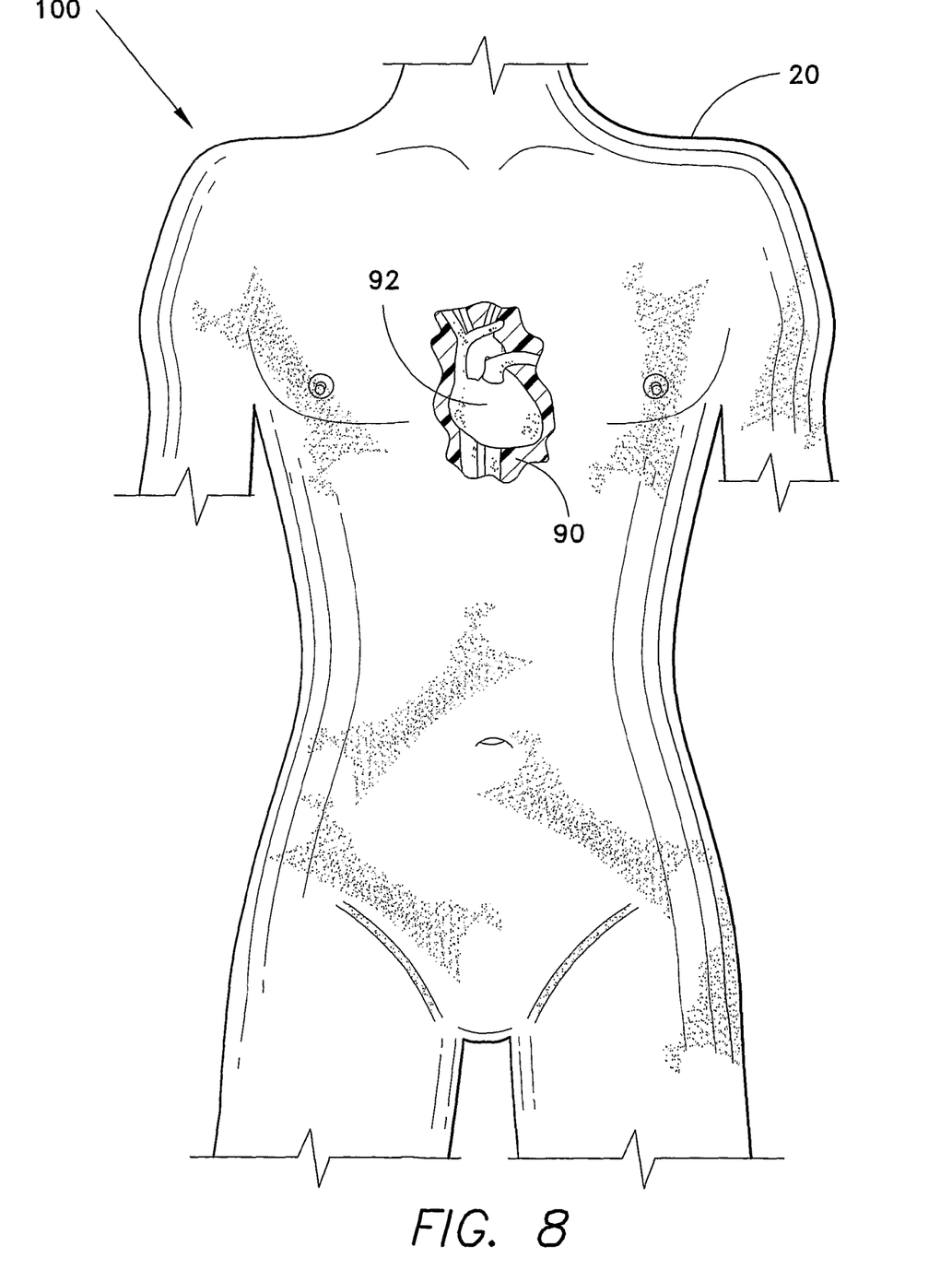
FIG. 8 is a top plan view of the ultrasound training mannequin of FIG. 1 with the simulated tissue removed, exposing the heart cavity and simulated heart.

Referring next to FIG. 8, a portion of the simulated skin structure 20 and simulated tissue structure 22 have been removed from mannequin 100 exposing the heart cavity 90 and simulated heart 92. Preferably, the simulated heart 92 is made with a variable density silicone material to simulate the sonic density of the heart as it would be inside a living human being.

The simulated organs and cavities within the mannequin can be filled with water or ultrasound gel to simulate naturally occurring body fluid. Various simulated abnormalities such as tumors, cysts, stones, fluid build-up and foreign bodies can be implanted in these organ models and the cavities surrounding them.

Figure 9:
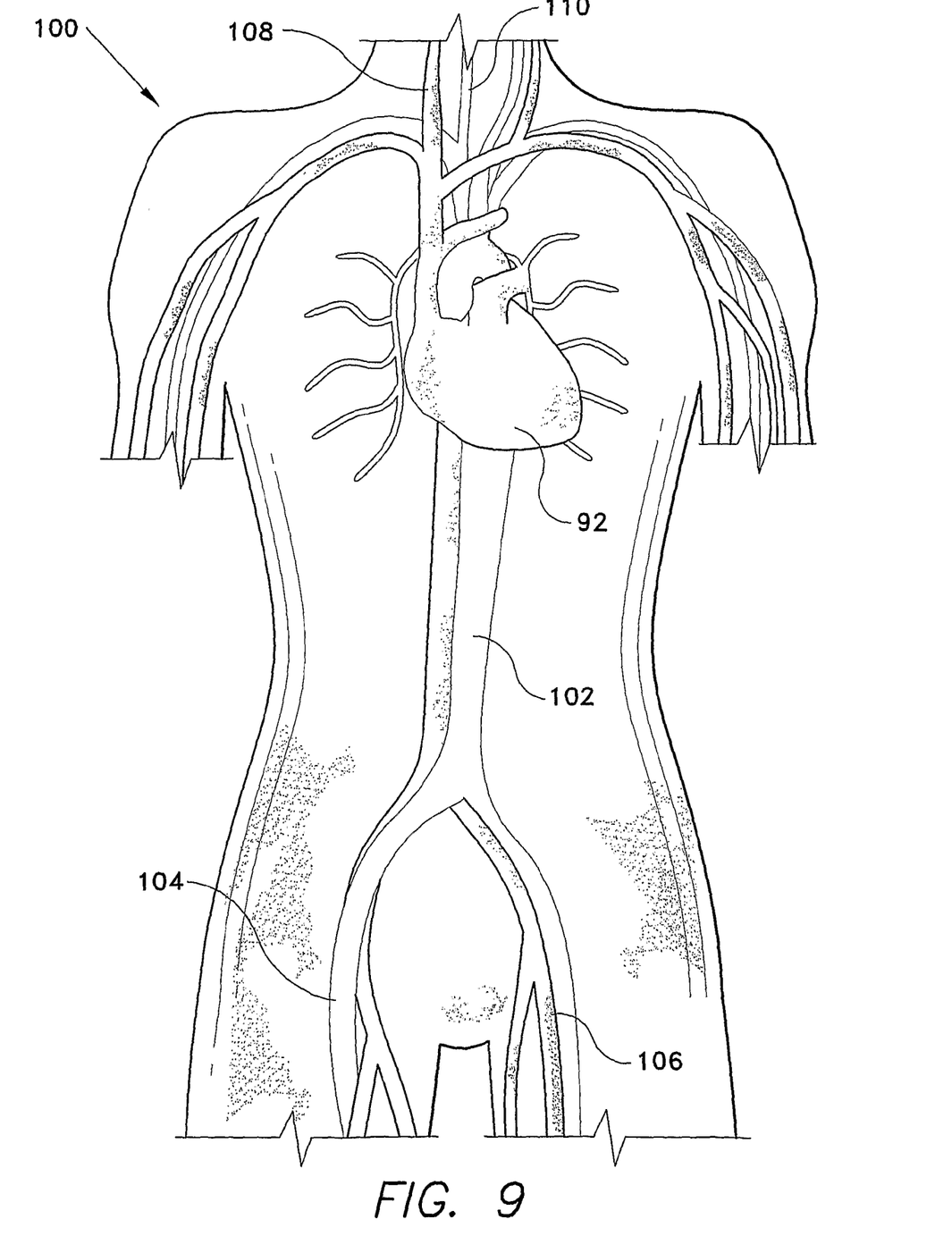
FIG. 9 is a top plan view of the ultrasound training mannequin of FIG. 1 with the simulated tissue removed, exposing the heart cavity, simulated heart, and simulated cardiovascular system.

Referring next to FIG. 9, a portion of the simulated skin structure 20 and simulated tissue structure 22 have been removed from mannequin 100 exposing the simulated heart 92, venous structure, and arterial structure. Included are the aorta 102, femoral artery 104, femoral vein 106, internal jugular vein 108, and the carotid artery 110. Preferably, the simulated venous and arterial structures are made as channels from a latex material to simulate the sonic density of these veins and arteries as they would be inside a living human being. Also, the channels can be filled with water or ultrasound gel to simulate the presence and flow of blood through the cardiovascular system. Various balloons can be incorporated into the cardiovascular structure, especially the aorta, and can be inflated or filled with liquid or gel to help simulate abnormalities such as an aneurysm.

Figure 10:
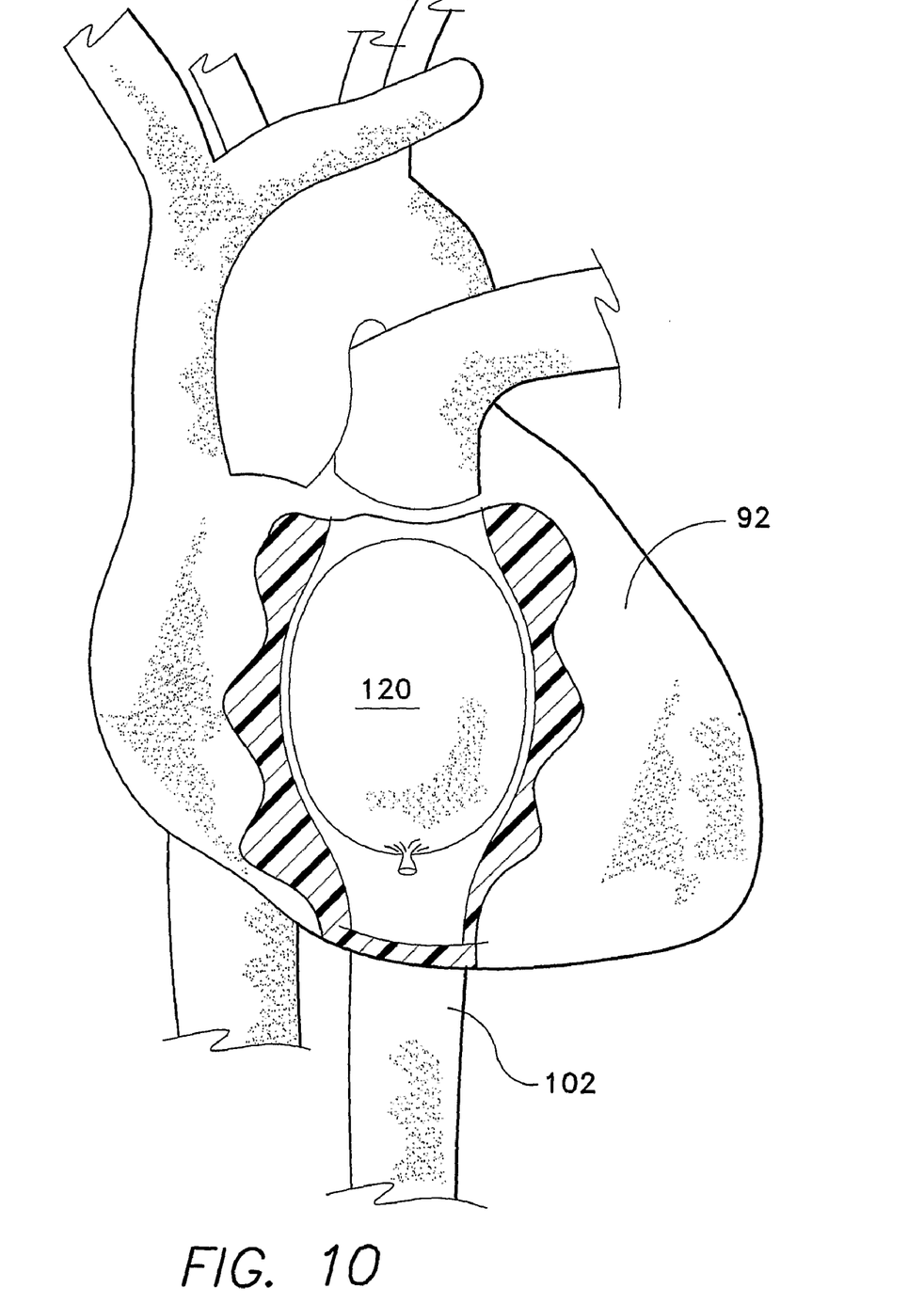
FIG. 10 is a cut away plan view of the simulated heart and cardiovascular system of the ultrasound training mannequin illustrating a balloon device for simulating an aneurysm.

FIG. 10 simply illustrates a latex balloon 120 filled with air, water or ultrasound gel and tied off to simulate, for example, an aortic aneurysm as discussed above.

With the mannequin constructed as described, a trainee can then examine the model as he would a patient using ultrasound imaging equipment. The model and its internal contents, in return, respond to the trainees' ultrasound examination to generate ultrasound images that correspond closely to those produced by a living patient with organs and abnormalities corresponding to those simulated as described and implanted in the model. The trainee can thus gain valuable experience in the application of ultrasound techniques and, more importantly, the critical analysis of ultrasound images produced by internal abnormalities such as tumors, cysts, stones, and aneurysms. The various simulated abnormalities can be intermixed and/or interchanged at will to provide a vast range of ultrasound experience in a very short time relative to experience with live patients.

The invention has been described in terms of specific preferred embodiments for use in emergency medicine ultrasound training. It will be obvious to those of skill in the art, however, that the invention embodied therein has application to many other medical specialties.

It is to be understood that the present invention is not limited to the embodiments described above, but encompasses any and all embodiments within the scope of the following claims.

We claim:

1. An ultrasound training mannequin, comprising:
a mostly solid body member configured to simulate the human male torso, and including a lower neck portion, two upper arm portions, and two upper leg portions;
one or more cavities within said body member;
one or more organ members configured to be contained within said cavities in said body member, said one or more organ members being constructed to simulate the ultrasonic response of internal human organs during ultrasonic examination, further wherein said one or more organ members are constructed from a variable density material to simulate the ultrasonic response of internal human organs during ultrasonic examination; and
one or more hollow channels configured to be contained in said body member, said one or more hollow channels being constructed to simulate the ultrasonic response of internal human veins and arteries during ultrasonic examination, wherein said one or more hollow channels are constructed from a latex material to simulate the ultrasonic response of internal human veins and arteries during ultrasonic examination and are filled with water or ultrasound gel to simulate the ultrasonic response of blood within said veins and arteries.

2. An ultrasound training mannequin as claimed in claim 1, wherein said body member has an outer skin structure, said skin structure being constructed from a silicone material to simulate the ultrasonic response of human skin during ultrasonic examination.

3. An ultrasound training mannequin as claimed in claim 1, wherein said body member has an interior tissue structure, said tissue structure being constructed from a silicone material to simulate the ultrasonic response of human tissue during ultrasonic examination.

4. An ultrasound training mannequin as claimed in claim 1, wherein said variable density material is silicone material or a foam material to simulate the ultrasonic response of internal human organs during ultrasonic examination.

5. An ultrasound training mannequin as claimed in claim 1, further comprising one or more inflatable balloon members contained within said hollow channels.

6. An ultrasound training mannequin as claimed in claim 1, further comprising a fluid means surrounding said one or more organ members for simulating the ultrasonic response of the internal body fluid during ultrasound examination.

7. An ultrasound training mannequin as claimed in claim 1, wherein said one or more organ members is a simulated liver.

8. An ultrasound training mannequin as claimed in claim 1, wherein said one or more organ members is a simulated spleen.

9. An ultrasound training mannequin as claimed in claim 1, wherein said one or more organ members is a simulated heart.

10. An ultrasound training mannequin as claimed in claim 1, wherein said one or more organ members is a simulated gall bladder.

11. An ultrasound training mannequin as claimed in claim 1, wherein said one or more organ members is a simulated urinary bladder.

12. An ultrasound training mannequin as claimed in claim 1, wherein said one or more organ members are simulated kidneys.

13. An ultrasound training mannequin as claimed in claim 1, wherein said one or more organ members are simulated lungs.

* * * * *